US008305384B2

(12) United States Patent
Yang et al.

(10) Patent No.: US 8,305,384 B2
(45) Date of Patent: Nov. 6, 2012

(54) SYSTEM AND METHOD FOR STORING AND ACCESSING PIXEL DATA IN A GRAPHICS DISPLAY DEVICE

(75) Inventors: Tsung-Han Yang, Tainan (TW); Chun-Yu Chiu, Tainan (TW)

(73) Assignee: Himax Technologies Limited, Tainan (TW)

( * ) Notice: Subject to any disclaimer, the term of this patent is extended or adjusted under 35 U.S.C. 154(b) by 252 days.

(21) Appl. No.: 12/775,412

(22) Filed: May 6, 2010

(65) Prior Publication Data

US 2011/0273462 A1 Nov. 10, 2011

(51) Int. Cl.
*G06F 13/00* (2006.01)

(52) U.S. Cl. ......................... 345/536; 345/540; 711/157

(58) Field of Classification Search .................. 345/540
See application file for complete search history.

(56) References Cited

U.S. PATENT DOCUMENTS 8,063,910 B2 * 11/2011 Swic ............................ 345/539
2001/0046321 A1 * 11/2001 Murakawa .................... 382/190
2005/0057572 A1 * 3/2005 Champion et al. ............ 345/540
2008/0100635 A1 * 5/2008 Wise et al. .................... 345/536
2008/0297525 A1 * 12/2008 Rai .............................. 345/534
2010/0283789 A1 * 11/2010 Lai et al. ....................... 345/502
2011/0038539 A1 * 2/2011 Karsanbhai et al. .......... 382/166

* cited by examiner

*Primary Examiner* — Kee M Tung
*Assistant Examiner* — Ryan D McCulley
(74) *Attorney, Agent, or Firm* — Baker & McKenzie LLP

(57) ABSTRACT

A graphics display device comprises a first and second memory, and a data transfer controller coupled with the first and second memory. In some embodiments, a method of storing pixel data comprises receiving and latching first pixel data associated with a first pixel, receiving second pixel data associated with a second pixel, and concurrently writing the first pixel data in the first memory and the second pixel data in the second memory. In other embodiments, a method of accessing pixel data of an image frame comprises accessing the first and second memory for reading out pixel data of each pair of adjacent pixels, when the image frame has an odd total number of pixels determining whether a final pixel data is in a latched state, and reading out the final pixel data from the data transfer controller when the final pixel data is in the latched state.

20 Claims, 9 Drawing Sheets

| MV | MX | MY | Writing Direction |
|---|---|---|---|
| 0 | 0 | 0 |  |
| 0 | 0 | 1 |  |
| 0 | 1 | 0 |  |
| 0 | 1 | 1 |  |
| 1 | 0 | 0 |  |
| 1 | 0 | 1 |  |
| 1 | 1 | 0 |  |
| 1 | 1 | 1 |  |

SYSTEM AND METHOD FOR STORING AND ACCESSING PIXEL DATA IN A GRAPHICS DISPLAY DEVICE

FIELD OF THE INVENTION

The invention generally relates to display devices, in particular to a system and method for storing and accessing pixel data in a graphics display device.

DESCRIPTION OF THE RELATED ART

Mobile devices such as cellular phones generally use a liquid crystal display (LCD) panel for displaying still images or video. The LCD panel is often coupled with a display driver that can receive image data with synchronizing signals from a host processor, and perform driving control of the LCD panel.

In certain systems, a display controller can also be provided for taking over the supply of image data and synchronizing signals from the host processor. The display controller may have a memory used for storing pixel data of the image to display. In order to reduce power consumption, the memory installed in the display controller is usually a static random access memory (SRAM), which consumes less power than other types of memories such as dynamic random access memory (DRAM). While the SRAM has an access speed that is slower than that of the bus interface with the host processor, the use of SRAM may still be sufficient for relatively small size LCD panels. However, as mobile devices have increasingly larger display screens with higher display resolution, the amount of pixel data stored in the memory of the display controller increases rapidly. As a result, the limited access speed of the SRAM may substantially hamper higher resolution display applications.

Therefore, there is a need for a system and method that can store and access pixel data in more efficient manner.

SUMMARY OF THE INVENTION

The present application describes a system and method for storing and accessing pixel data in a graphics display device. In some embodiments, a method of storing pixel data in a graphics display device is described, wherein the graphics display device includes a first memory, a second memory and a data transfer controller respectively coupled with the first and second memory. For each pair of successively adjacent pixels of an image frame, the method can comprise receiving and latching first pixel data associated with a first pixel, receiving second pixel data associated with a second pixel, and concurrently writing the first pixel data in the first memory and the second pixel data in the second memory.

In other embodiments, the present application also describes a graphics display device. The graphics display device comprises a first memory, a second memory, and a data transfer controller coupled with the first and second memory. The data transfer controller is configured to receive and latch first pixel data associated with a first pixel, receive second pixel data associated with a second pixel, and concurrently write the first pixel data in the first memory and the second pixel data in the second memory.

In yet other embodiments, a method of accessing pixel data of an image frame in a graphics display device is described. The method comprises accessing the first and second memory for reading out pixel data of each pair of adjacent pixels of the image frame, when the image frame has an odd total number of pixels determining whether a final pixel data associated with a final pixel of the image frame is in a latched state, and reading out the final pixel data from the data transfer controller when the final pixel data is in the latched state.

At least one advantage of the systems and methods described herein is the ability to access at least two memories in a concurrent manner for writing pixel data in synchronous pairs. As a result, the overall memory access speed can be increased.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
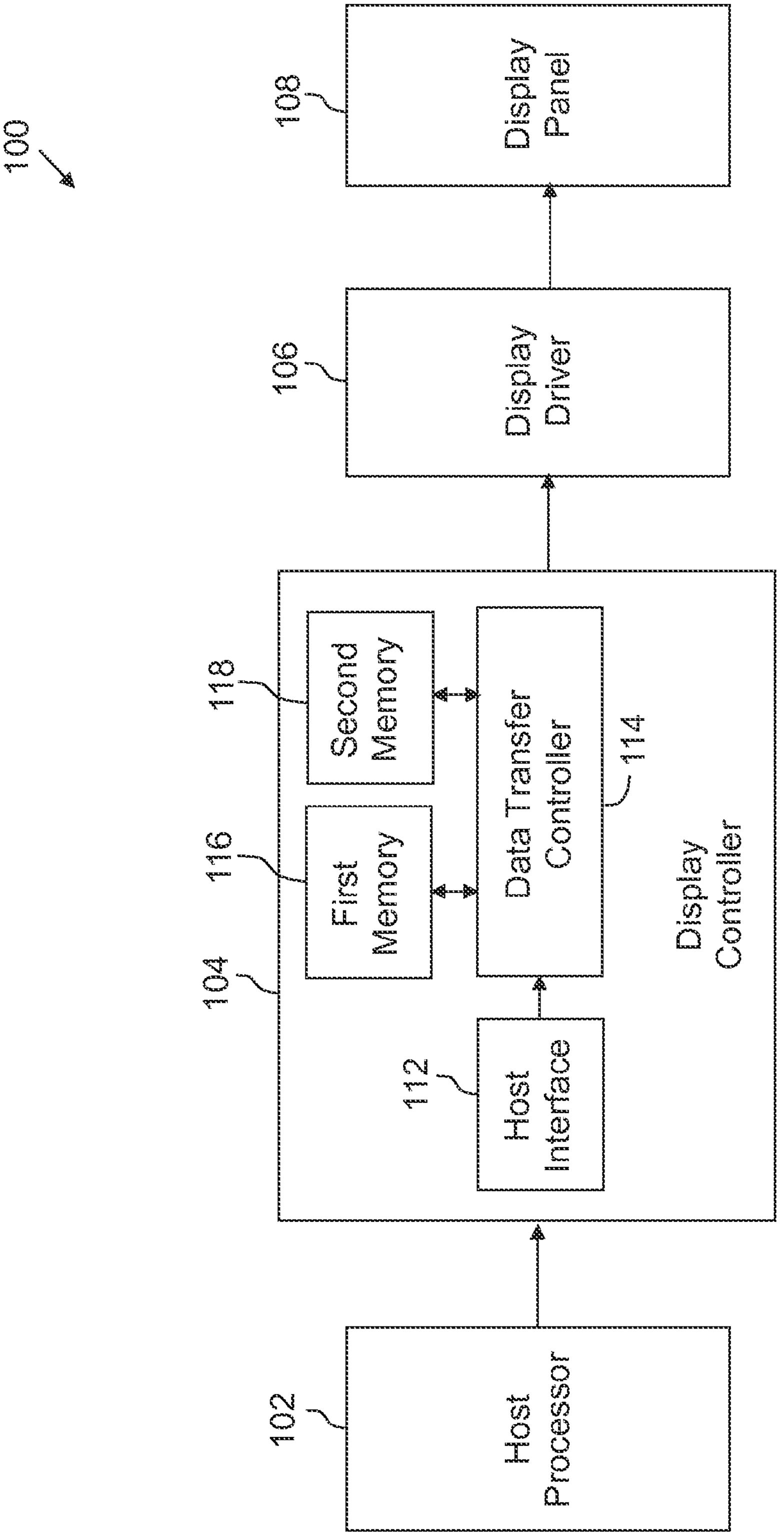
FIG. 1 is a schematic diagram illustrating a graphics display device according to an embodiment of the present invention.

FIG. 1 is a schematic diagram illustrating a graphics display device 100 according to an embodiment of the present invention. The graphics display device 100 can be a mobile phone, a personal digital assistant, a game device, a personal computer, a laptop computer, or other devices that performs one or more functions that include image display. According to one embodiment, the graphics display device 100 can include a host processor 102, a display controller 104, a display driver 106, and a display panel 108. The host processor 102 can perform processing tasks required by the graphics display device 100. In particular, the host processor 102 may process or render image data into pixel data for presentation on the display panel 108, and supply the pixel data to the display controller 104. The display driver 106, which may include a timing controller, source driver and gate driver (not shown), can receive pixel data from the display controller 104, and convert the pixel data into driving signals for controlling an array of pixels in the display panel 108.

The display controller 104 is used for storing pixel data supplied from the host processor 102. In addition, the display controller 104 may also take over certain image processing tasks from the host processor 102 for reducing a process load of the host processor 102. As shown, the display controller 104 can include a host interface 112, a data transfer controller 114, and a first and second memory 116 and 118. In one embodiment, the first and second memory 116 and 118 can be static random access memories (SRAMs). The host interface 112 can receive pixel data to store in a sequential manner from the host processor 102, and transmit the stream of pixel data to the data transfer controller 114. The data transfer controller 114 is respectively coupled with the first and second memory 116 and 118 in a manner that allows independent driving of either of the first and second memory 116 and 118. The data transfer controller 114 can be configured to receive and latch first pixel data associated with a first pixel (denoted as "L"), receive second pixel data associated with a second pixel (denoted as "R"), and concurrently write the first pixel data in the first memory 116 and the second pixel data in the second memory 118. The first and second pixels are adjacent pixels of an image frame, which can be in a same line or a same column of the image frame. The data transfer controller 114 can assign addresses in either of the first or second memory 116 and 118 to pixel data received from the host interface 112 and store pixel data of an image frame in the first and second memory 116 and 118 by concurrently accessing the first and second memory 116 and 118 for writing the pixel data therein. Moreover, for each given pixel of the image frame having associated pixel data stored in one of the first and second memory 116 and 118, every pixel that is adjacent to the given pixel has corresponding pixel data that are to be stored in the other one of the first and second memory 116 and 118. Besides, the data transfer controller 114 can also output the pixel data written in the first and second memory when access to the pixel data is required. Therefore, the data transfer controller 114 can read pixel data from the first and second memory 116 and 118 after receiving access commands from the host processor 102, and transfer the pixel data to either of the host processor 102 or display driver 106.

Figure 2:
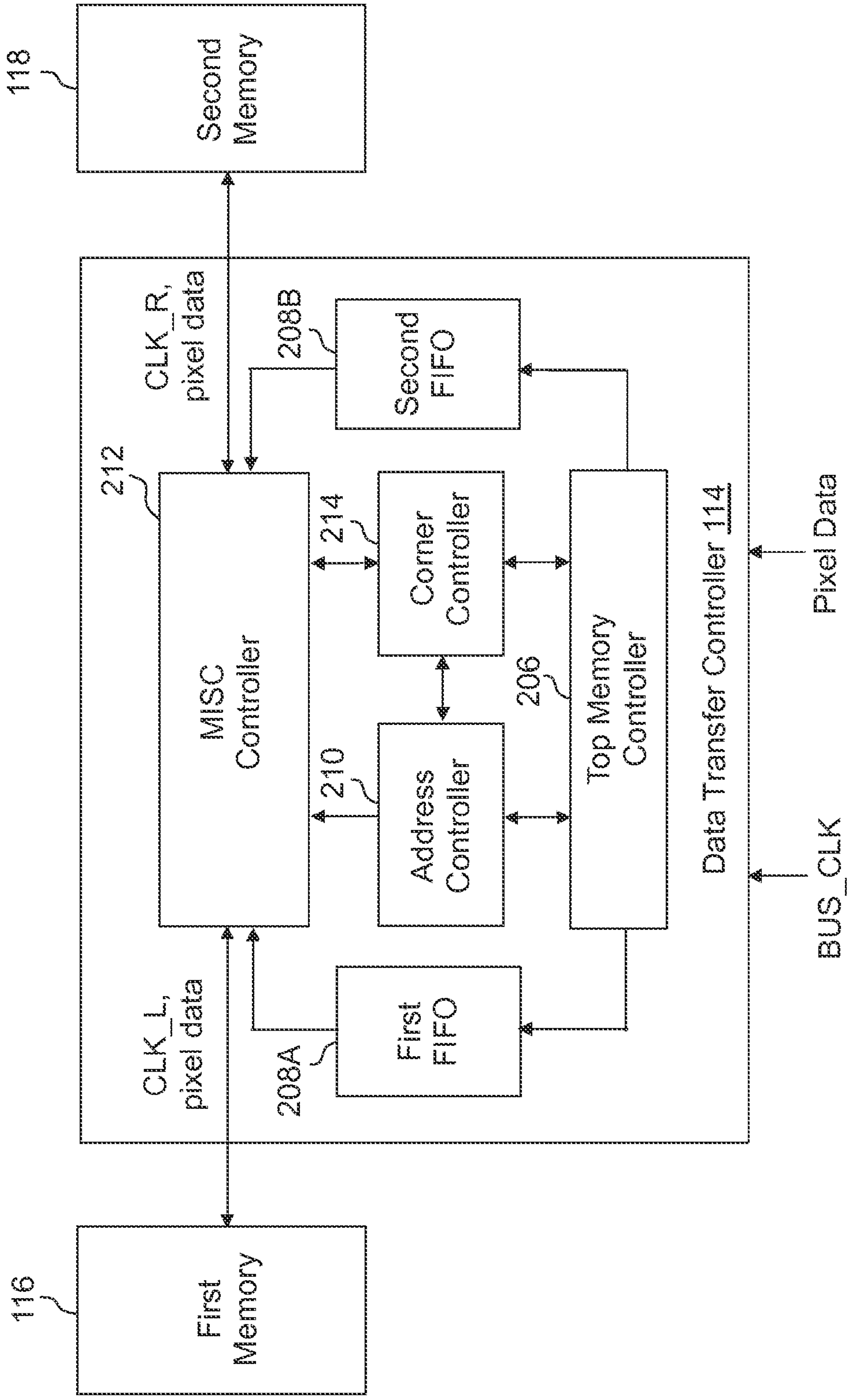
FIG. 2 is a schematic diagram illustrating one embodiment of a data transfer controller implemented in the graphics display device shown in FIG. 1.

FIG. 2 is a schematic diagram illustrating one embodiment of the data transfer controller 114. The data transfer controller 114 can include a top memory controller 206, first and second First-In-First-Out (FIFO) buffers 208A and 208B, an address controller 210, a MISC (Minimal Instruction Set Computer) controller 212, and a corner controller 214. The top memory controller 206 can receive various signals including control signals (e.g., bus clock signal BUS-CLK), pixel data of an image frame, and frame size data related to the image frame from the host interface 112, and latch the pixel data in either of the first FIFO buffer 208A or second FIFO buffer 208B. The address controller 210 can assign to each pixel data a storage address in either of the first and second memory 202A and 202B, and transmit the storage address to the MISC controller 212. The MISC controller 212 can access the first and second memory 116 and 118 for writing in or reading out pixel data. More particularly, the MISC controller 212 can concurrently access the first and second memory 116 and 118 in synchronization with associated clock signals CLK_L and CLK_R for writing pixel data from the FIFO buffers 208A and 208B into the first and second memory 116 and 118. As a result, pixel data can be written synchronously in pairs into the first and second memory 116 and 118 for speeding up the access time. When the total number of pixels of an image frame is an odd number, the corner controller 214 can handle pixel data associated with a "corner" or final pixel of the image frame, as it cannot be paired with a next pixel for writing in the memory. In this case, the corner controller 214 can receive a final pixel data associated with a final pixel of the image frame and latch the final pixel data. Moreover, the data transfer controller 114 can release and write the latched final pixel data into the first memory 116 when a next command cycle is triggered. Therefore, the corner controller 214 can temporarily keep information related to the final pixel data, and output the final pixel data in timely manner for either writing in the memory or outputting for display to the display driver 106.

Figure 3A:
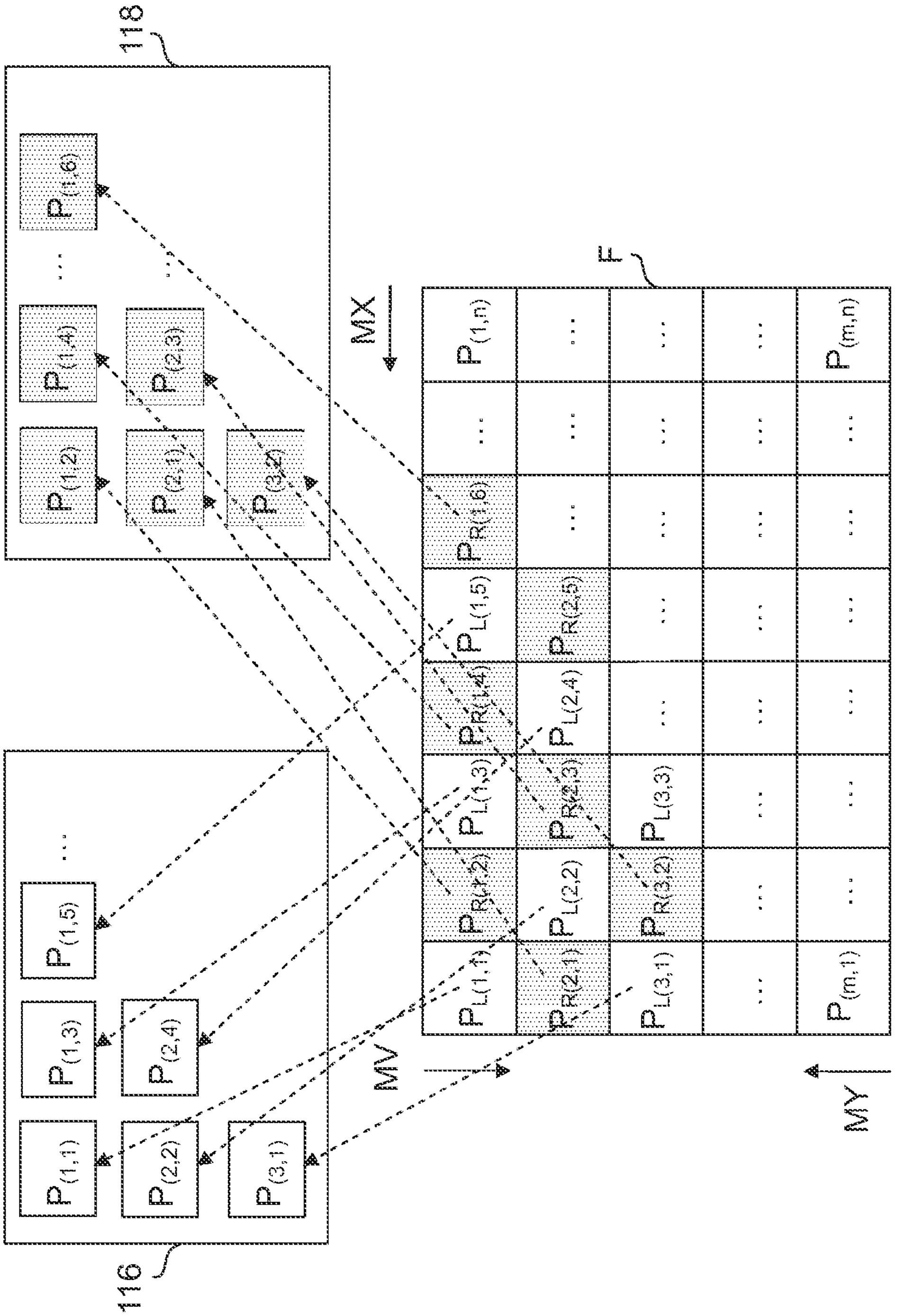
FIG. 3A is a schematic diagram illustrating how pixel data of a frame F are stored in first and second memory incorporated in the graphics display device shown in FIG. 1, according to an embodiment of the present invention.

FIG. 3A is a schematic diagram illustrating how pixel data of an image frame F are stored in the first and second memory 116 and 118, according to an embodiment of the present invention. As shown, the image frame F can be defined as an array of pixel data P(i,j), wherein i is an integer designating a horizontal line of the pixel data, and j is an integer designating a vertical column of the pixel data, the size of the frame F being defined by the total number of lines m and the total number of columns n. Pixel data of the image frame F may be written in the first and second memory 116 and 118 according to different directions.

Figure 3B:
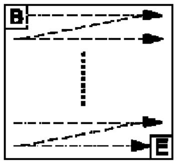
FIG. 3B illustrates different directions for data writing according to alternative embodiments of the present invention.
Figure 3B:
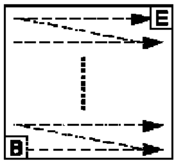
Figure 3B:
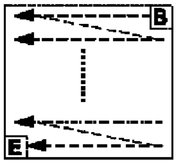
Figure 3B:
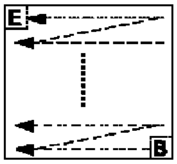
Figure 3B:
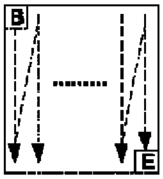
Figure 3B:
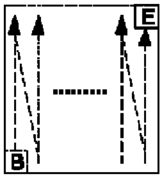
Figure 3B:
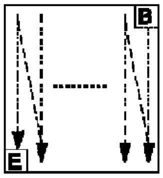
Figure 3B:
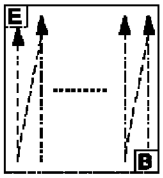

FIG. 3B illustrates different directions for data writing. Pixel data of the image frame F can be written sequentially line by line or column by column along different directions according to the settings of a plurality of parameters (MV, MX, MY). Each of the parameters MV, MX, and MY can represent a vertical, reverse horizontal, and reverse vertical scan sequence respectively. As illustrated in 3B, the process of writing pixels can begin at start point "B" and end at end point "E". For example, the setting of (MV, MX, MY)=(0, 0, 0) corresponds to an access sequence in which pixels of the frame F are written in a normal direction, i.e., from left to right. The setting of (MV, MX, MY)=(1, 0, 0) corresponds to another access sequence in which pixels of the frame F are written from top to bottom. The setting of (MV, MX, MY)=(0, 1, 0) corresponds to another access sequence in which pixels of the frame F are written from right to left; and (MV, MX, MY)=(0, 0, 1) corresponds to another access sequence in which pixels of the frame F are written from bottom to top. Other directions for data writing may include (MV, MX, MY)=(0, 1, 1) corresponding to a sequence from right to left, and from bottom to top, (MV, MX, MY)=(1, 0, 1) corresponding to a sequence from bottom to top, and from left to right, (MV, MX, MY)=(1, 1, 0) corresponding to a sequence from top to bottom, and from right to left, and (MV, MX, MY)=(1, 1, 1) corresponding to a sequence from bottom to top, and from right to left.

Regardless of the writing sequence, the storage of the image frame F is such that adjacent pixel data in a same column and adjacent pixel data in a same line are always stored in a different memory (in FIG. 3A, gray boxes of the array designate pixel data that are stored in the second memory 118, whereas white boxes designate pixel data that are stored in the first memory 116). For example, adjacent pixel data P(1,1) and P(1,2) in a same horizontal line can be stored in the first and second memory 116 and 118, respectively. In the same manner, adjacent pixel data P(1,1) and P(2,1) in a same vertical column can be stored in the second and first memory 118 and 116, respectively. Accordingly, for each given pixel data of the image frame F having associated pixel data stored in one of the first and second memory 116 and 118, every pixel that is adjacent to the given pixel has corresponding pixel data that are stored in the other one of the first and second memory 116 and 118. In this manner, regardless of the applied data direction for data writing, the first and second memory 116 and 118 can always be accessed in a concurrent manner for synchronously writing each pair of successively adjacent pixel data.

Figure 4:
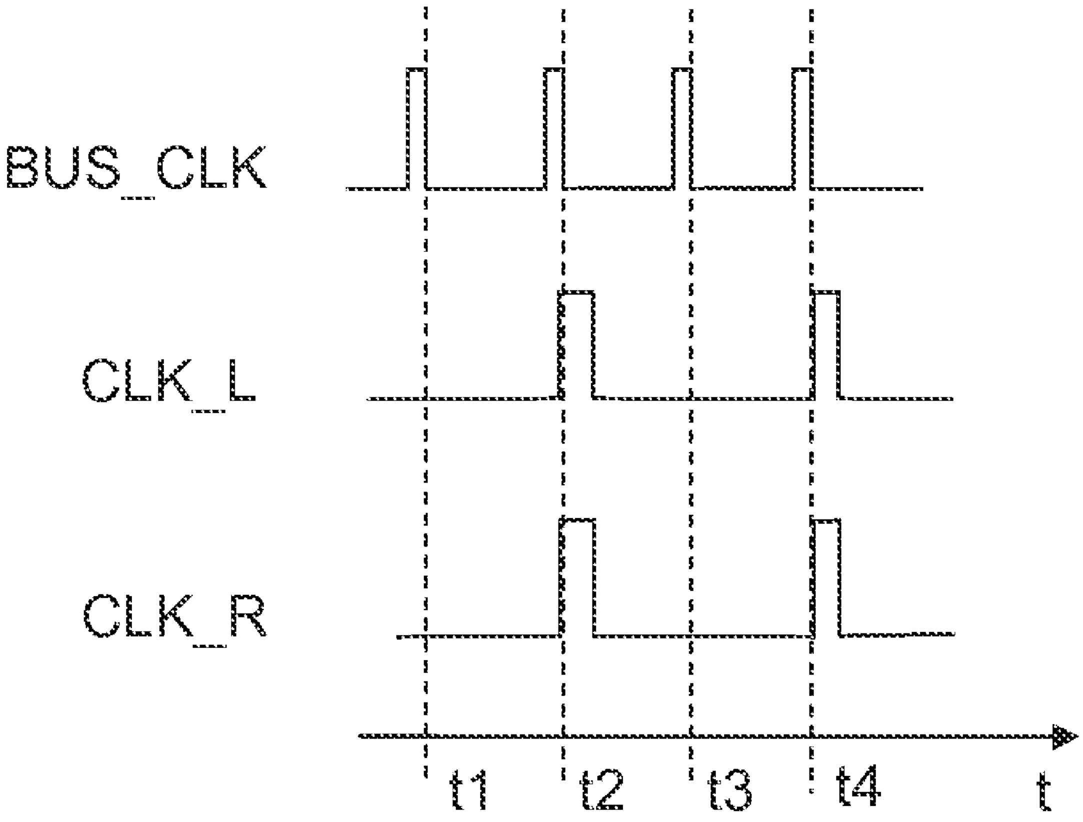
FIG. 4 is a time diagram of clock signals illustrating how pixel data can be synchronously written in pairs in the first and second memory shown in FIG. 3A.
Figure 5:
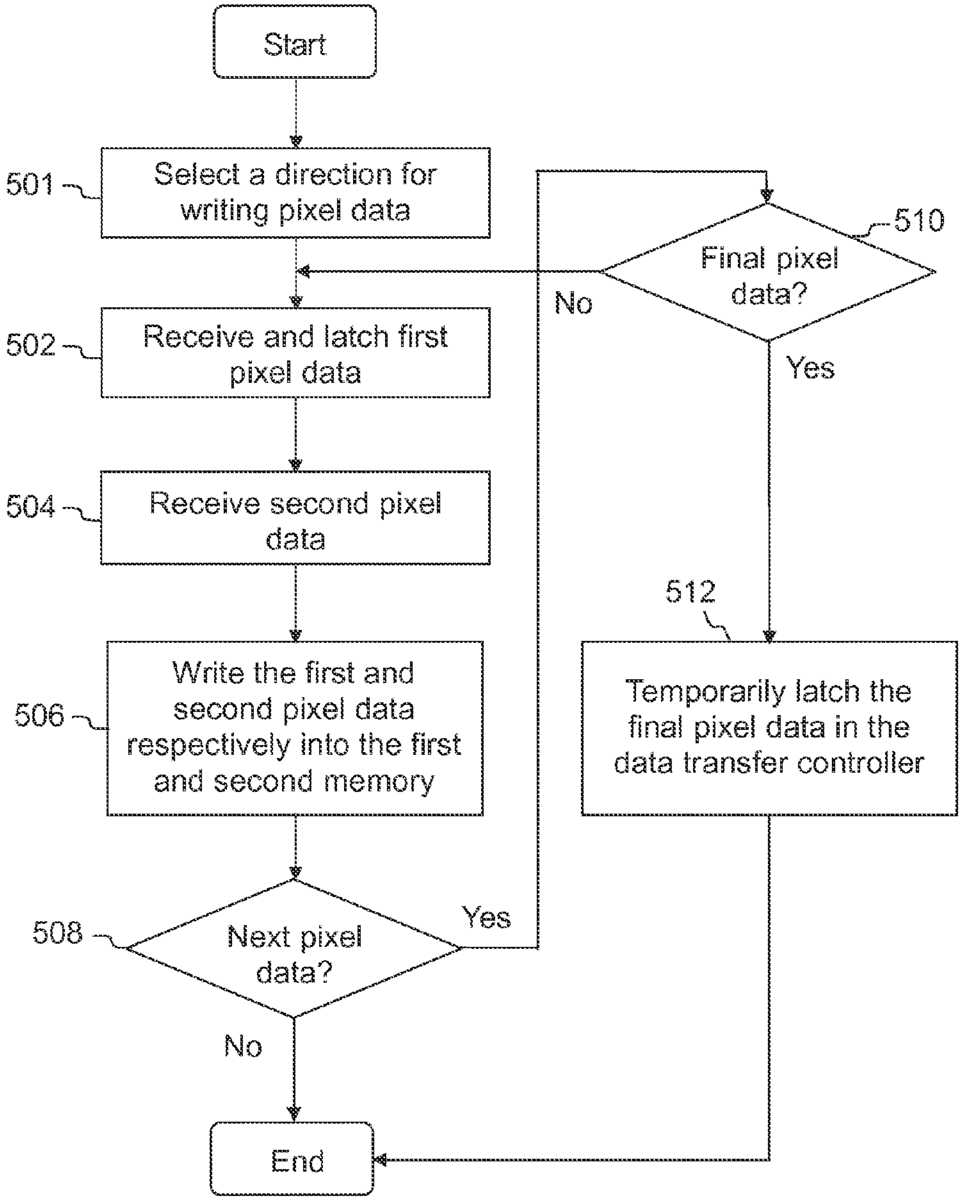
FIG. 5 is a flowchart of method steps performed by the data transfer controller for writing pixel data, according to one embodiment of the present invention.

FIG. 4 is a time diagram of clock signals illustrating how pixel data can be synchronously written in pairs in the first and second memory 116 and 118. At time t1, the data transfer controller 114 can receive and latch pixel data (e.g., pixel data P(1,1) of the image frame F) in synchronization with a pulse of the bus clock signal BUS_CLK. At following time t2, in synchronization with a next pulse of the bus clock signal BUS_CLK, the data transfer controller 114 can receive a next pixel data (e.g., pixel data P(1,2) of the image frame F) adjacent to the previously received pixel data, and then concurrently access the first and second memory 116 and 118 for respectively writing the two adjacent pixel data in synchronization with two synchronous pulses of the clock signals CLK_L and CLK_R. The same access scheme can be repeated successively (e.g., at time t3 and t4) for writing each next pair of adjacent pixel data (e.g., pixel data P(1,3) and P(1,4) of the image frame F) in the first and second memory 116 and 118. While the access frequency for each of the first and second memory 116 and 118 is the same, the total access frequency can be thereby multiplied by two.

Figure 8A:
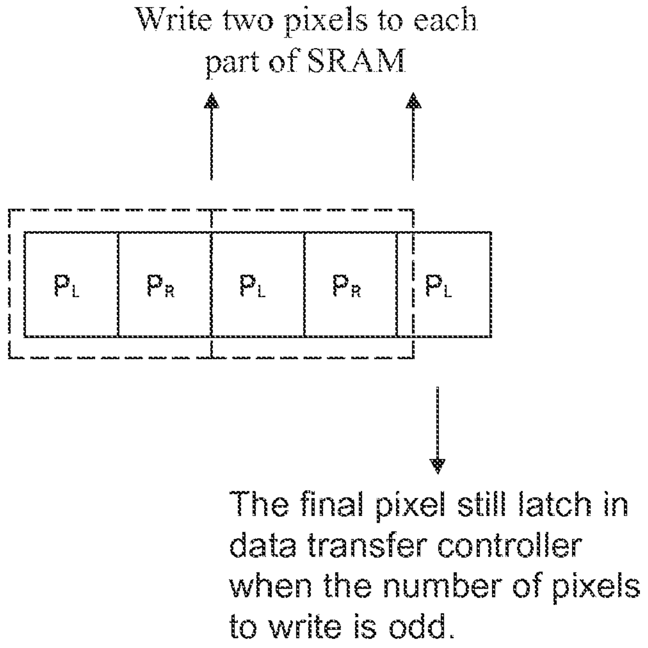
FIG. 8A is a schematic diagram showing an example of corner pixel occurring when the number of pixels to write is odd.

While the aforementioned scheme can be generally applied for each pair of adjacent pixels, specific handling may be needed for corner pixels and/or when the number of pixels to write is an odd number. For illustration, FIG. 8A is a schematic diagram showing an example of corner pixel occurring when the number of pixels to write is odd. The data transfer controller 114 can receive and latch pixel data associated with each pair of pixels, and then write these data in the physical memory such as first and second memories 116 and 118, as described previously. However, the final pixel may not be written to the physical memory when the total number of pixels is odd. For example, if there are five pixels to be written into the first and second memories 116 and 118, the fifth pixel may be kept in the data transfer controller 114. The data associated with the final pixel can be read out or written into one of the first and second memories 116 and 118 later when a next command occurs.

Figure 8B:
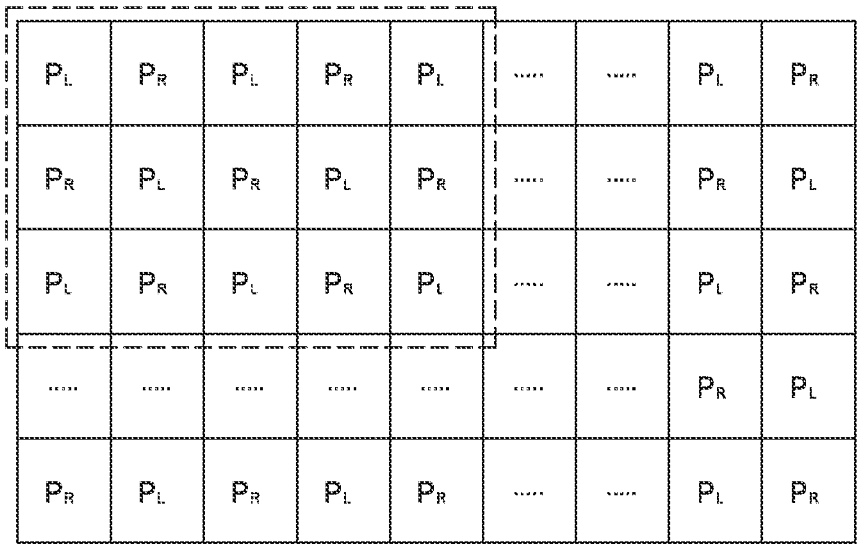
FIG. 8B is a schematic diagram illustrating another example of corner pixel occurring when the number of pixels to write in an active window is odd.

FIG. 8B is a schematic diagram illustrating another example of corner pixel occurring when the number of pixels to write in an active window is odd. An active window can be a portion of a frame to be accessed by the display controller 104. The display controller 104 can sequentially process each pixel of the active window, from the first pixel to the last pixel, and then return to the first pixel for refreshing the active window. When the number of pixels in the active window is odd, the final pixel and the first pixel in the active window may be written into the same physical memory (i.e., either one of the first and second memories 116 and 118) if no specific handling distinctive from the aforementioned scheme is applied. According to one embodiment, the final pixel in the active window may be kept in the data transfer controller 114 rather than being written to anyone of the first and second memories 116 and 118. The data kept in the data transfer controller 114 may be read out or written into one of the first and second memories 116 and 118 in response to the occurrence of a next command.

It can be appreciated that only one of the first and second memories 116 and 118 needs to be accessed for writing the final pixel data kept in the data transfer controller 114 at a next write command. Moreover, in case the final pixel data is needed for display or other process uses before the next write command is issued, the system is able to retrieve the correct final pixel data from the data transfer controller 114.

In conjunction with FIGS. 1, 2, 3A-B, and 8A-B, FIG. 5 is a flowchart of method steps of storing pixel data in the graphics display device 100 including a first memory 116, a second memory 118 and a data transfer controller 114 respectively coupled with the first and second memory 116 and 118. The method steps described herein can be performed by the data transfer controller 114 for writing pixel data. In initial step 501, a direction for data writing is first selected for the data transfer controller 114. As described previously, the selected direction for data writing can be defined by the setting of the parameters (MV, MX, MY). In step 502, the data transfer controller 114 can receive and latch first pixel data associated with a first pixel of an image frame in synchronization with a pulse of the bus clock signal BUS_CLK. In following step 504, the data transfer controller 114 can receive second pixel data associated with a second pixel that is adjacent to the first pixel in synchronization with a next pulse of the bus clock signal BUS_CLK. The first and second pixels can be in a same line or a same column of the image frame. In step 506, the data transfer controller 114 can then concurrently write the first pixel data in the first memory 116 and the second pixel data in the second memory 118 in synchronization with synchronous clock signals CLK_L and CLK_R. In next step 508, the data transfer controller 114 may then determine whether there is a next pixel to process. If it is not the case, the image frame has an even total number of pixels, and the process can be ended.

In case there is a next pixel to process, the data transfer controller 114 in following step 510 further determines whether the next pixel is a final pixel of the image frame being currently processed. When the next pixel is not a final pixel, steps 502-506 may be repeated in the same manner previously described for writing a following pair of adjacent pixels. Each pair of successively adjacent pixels of the image frame can be processed in the same manner along the selected direction for data writing.

In contrast, if the next pixel to process is a final pixel, the currently processed frame has an odd total number of pixels. In this case, the corner controller 214 can receive a final pixel data associated with a final pixel of the image frame and latch the final pixel data. The corner controller 214 in step 512 can temporarily save the pixel data associated with the final pixel and its related storage address. As described below, the final pixel data may be released into the first memory 116 later when a next command cycle is triggered. For example, the final pixel data latched in the corner controller 214 can be outputted when access to the final pixel data is required, or written into the first memory 116 in response to the occurrence of a next write command.

Figure 6:
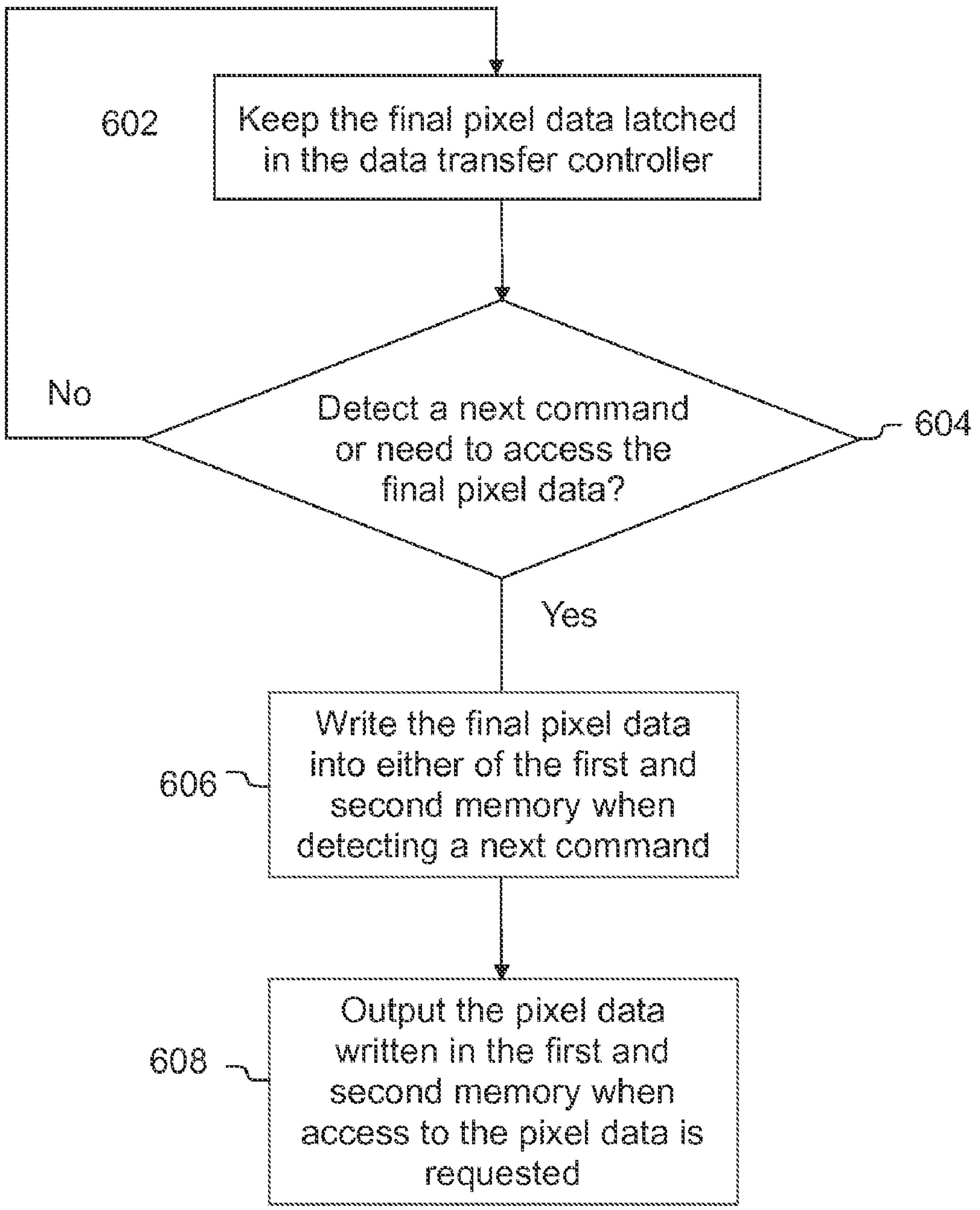
FIG. 6 is a schematic diagram illustrating a process flow for releasing a final pixel data latched in the data transfer controller, according to an embodiment of the present invention.
Figure 7:
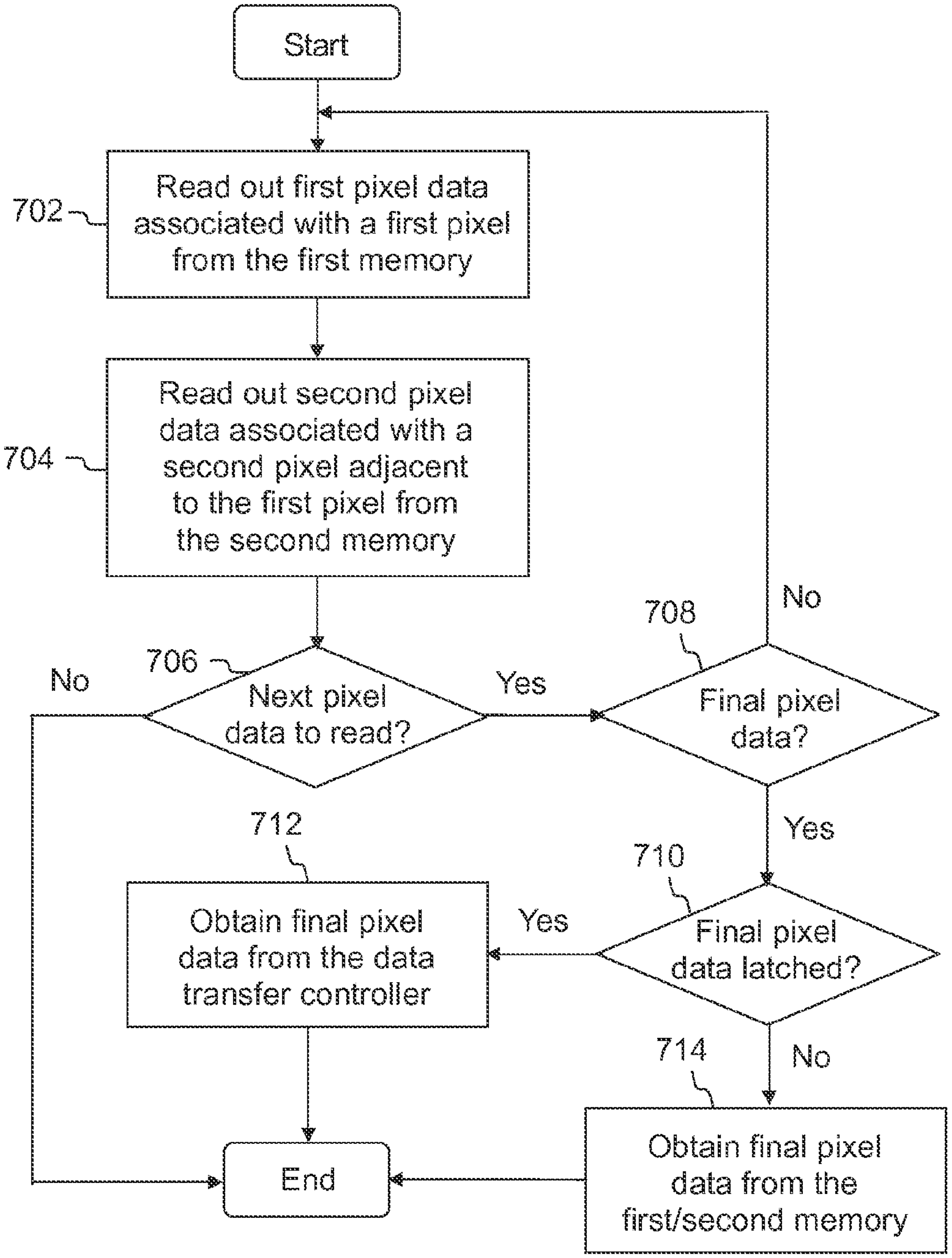
FIG. 7 is a flowchart of method steps performed by the data transfer controller for reading out pixel data of a frame, according to one embodiment of the present invention.

FIG. 6 is a schematic diagram illustrating a process flow performed by the data transfer controller 114 for releasing the final pixel data latched in the corner controller 214. In step 602, the final pixel data is kept latched in the corner controller 214 of the data transfer controller 114. In step 604, the data transfer controller 114 can detect whether a next command is issued, or whether access to the final pixel data is required. A next command may be, for example, a command for writing into either of the first and second memory 116 and 118. On the other hand, a need for accessing the final pixel data may occur when, for example, pixel data of a frame stored in the first and second memory 116 and 118 have to be read out for display on the display panel or undergoing further processing. If no next command and need for accessing the final pixel data are detected, the final pixel data is kept latched in the corner controller 214. In case a next command is detected (e.g., when the next command cycle is triggered), the corner controller 214 in step 606 can release the final pixel data, which is consequently written in either of the first and second memory 116 and 118 for completing the pixel data of the image frame stored therein. In step 608, pixel data written in the first and second memory 116 and 118 can be outputted when access to the pixel data is requested.

In case access to the final pixel data is required while the final pixel data is still latched in the corner controller 214, the data transfer controller 114 in step 608 can directly output the final pixel data latched in the corner controller 214 in replacement of the pixel data stored at the corresponding storage location in either one of the first and second memory 116 and 118. This can ensure that the correct final pixel data is read out.

With the foregoing embodiments, pixel data of the image frame can therefore be stored in synchronous pairs in the first and second memory 116 and 118. As a result, the overall memory access speed can be multiplied by two.

In conjunction with FIGS. 1, 2, 3A-B, and 8A-B, FIG. 7 is a flowchart of method steps performed by the data transfer controller 114 for reading out pixel data of a frame stored in the first and second memory 116 and 118. The illustrated process flow may be performed by the data transfer controller 114 in response to instructions that require access to the pixel data of a frame stored in the first and second memory 116 and 118, such as a frame readout instruction. In initial step 702, the data transfer controller 114 can read out first pixel data associated with a first pixel of the frame from the first memory 116. In following step 704, the data transfer controller 114 can read out second pixel data associated with a second pixel that is adjacent to the first pixel from the second memory 118. It is worth noting that that steps 702 and 704 may be interchanged, or performed concurrently as the data transfer controller 114 is adapted to independently access the first and second memory 116 and 118.

In next step 706, the data transfer controller 114 can determine whether there is a next pixel data to read out. If it is not the case, the process ends. Otherwise, the data transfer controller 114 in step 708 can determine whether the next pixel data is a final pixel data. If the next pixel data is not a final pixel data, steps 702-706 may be repeated in the same manner described previously to access the first and second memory 116 and 118 for reading out pixel data of a following pair of adjacent pixels of the image frame. Otherwise, it can be determined that the image frame has an odd total number of pixels. Accordingly, in step 710, the data transfer controller 114 can further determine whether the final pixel data is in a latched state in the corner controller 214. If it is the case, in step 712, the final pixel data latched in the corner controller 214 can be read out as the correct final pixel data in replacement of the one stored in either of the first and second memory 116 and 118. If the corner controller 214 is not latching the final pixel data, which means that the final pixel data has been released from the corner controller 214 to the first and second memory 116 and 118, the data transfer controller 114 in step 714 can read out the correct final pixel from either of the first and second memory 116 and 118.

At least one advantage of the systems and methods described herein is the ability to access multiple memories in a concurrent manner for writing pixel data in synchronous pairs. Moreover, the systems and methods described herein can successfully handle specific situations when pixels cannot be paired, such as for the corner pixel of an image frame as illustrated in FIGS. 8A and 8B. Therefore, the access rate can be effectively increased by at least two times compared to conventional interfaces.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a “Technical Field,” such claims should not be limited by the language chosen under this heading to describe the so-called technical field. Further, a description of a technology in the “Background” is not to be construed as an admission that technology is prior art to any invention(s) in this disclosure. Neither is the “Summary” to be considered as a characterization of the invention(s) set forth in issued claims. Furthermore, any reference in this disclosure to “invention” in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of storing pixel data in a graphics display device including a first memory, a second memory and a data transfer controller respectively coupled with the first and second memory, the method comprising:

selecting a direction for data writing;

for each pair of successively adjacent pixels of an image frame, performing a plurality of steps comprising:

receiving and latching first pixel data associated with a first pixel in the data transfer controller;

receiving second pixel data associated with a second pixel in the data transfer controller; and concurrently writing the first pixel data in the first memory and the second pixel data in the second memory; and when a total number of pixels in the image frame is an odd number, applying a corner handling process comprising:

receiving and keeping a final pixel data associated with a final pixel of the image frame in the data transfer controller;

in response to a next command, releasing the final pixel data from the data transfer controller, wherein the final pixel data is written from the data transfer controller into the first memory when the next command is a write command, and the final pixel data is read out from the data transfer controller to undergo data processing or displaying applied on the image frame when the next command is a read command.

2. The method according to claim 1, wherein the first pixel and the second pixel are in a same line of the image frame.

3. The method according to claim 1, wherein the first pixel and the second pixel are in a same column of the image frame.

4. The method according to claim 1, wherein the selected direction for data writing is defined by setting a plurality of parameters (MV, MX, MY), each of the parameters MV, MX, and MY represents a vertical, reverse horizontal, and reverse vertical scan sequence respectively.

5. The method according to claim 1, wherein for each given pixel data of the image frame having associated pixel data stored in one of the first and second memory, every pixel that is adjacent to the given pixel has corresponding pixel data that are stored in the other one of the first and second memory.

6. The method according to claim 1, further comprising outputting the final pixel data kept in the data transfer controller to a host interface when access to the pixel data is required.

7. The method according to claim 1, wherein the pairs of successively adjacent pixels are taken along vertical columns of the image frame.

8. The method according to claim 1, wherein the step of receiving and latching first pixel data associated with a first pixel in the data transfer controller includes storing the first pixel data in a first FIFO (First In, First Out) buffer of the data transfer controller, and the step of receiving second pixel data associated with a second pixel in the data transfer controller includes storing the second pixel data in a second FIFO buffer of the data transfer controller.

9. The method according to claim 8, wherein the step of receiving and keeping a final pixel data associated with a final pixel of the image frame in the data transfer controller includes latching the final pixel data in a corner controller of the data transfer controller that is distinct from the first and second FIFO buffers.

10. A graphics display device comprising:

a first memory;

a second memory; and a data transfer controller respectively coupled with the first and second memory and operable to access the first and second memory for storing pixel data of an image frame therein, wherein the data transfer controller is configured to receive and latch first pixel data associated with a first pixel of the image frame;

receive second pixel data associated with a second pixel of the image frame;

concurrently write the first pixel data in the first memory and the second pixel data in the second memory; and when a total number of pixels of the image frame is an odd number, the data transfer controller applies a corner handling process comprising:

receiving and keeping a final pixel data associated with a final pixel of the image frame in the data transfer controller; and in response to a next command, releasing the final pixel data from the data transfer controller, wherein the final pixel data is written from the data transfer controller into the first memory when the next command is a write command, and the final pixel data is read out from the data transfer controller to undergo data processing or displaying applied on the image frame when the next command is a read command.

11. The device according to claim 10, wherein the first and second pixels are adjacent pixels of an image frame.

12. The device according to claim 11, wherein the first pixel and the second pixel are in a same line of the image frame.

13. The device according to claim 11, wherein the first pixel and the second pixel are in a same column of the image frame.

14. The device according to claim 10, wherein the first and second memories include static-random-access memories.

15. The device according to claim 10, wherein the data transfer controller is adapted to store pixel data of an image frame in the first and second memory by concurrently accessing the first and second memory for writing the pixel data in synchronous pairs.

16. The device according to claim 15, wherein for each given pixel data of the image frame having associated pixel data stored in one of the first and second memory, every pixel that is adjacent to the given pixel has corresponding pixel data that are stored in the other one of the first and second memory.

17. The device according to claim 10, wherein the data transfer controller is configured to output the final pixel data kept in the data transfer controller to a host interface when access to the final pixel data is required.

18. The device according to claim 10, wherein the data transfer controller includes a first and a second FIFO buffer in which the first and second pixel data are respectively stored before being concurrently written in the first and second memory.

19. The device according to claim 18, wherein the data transfer controller includes a corner controller in which the final pixel data is latched during the corner handling process.

20. A method of accessing pixel data of an image frame in a graphics display device including a first memory, a second memory and a data transfer controller respectively coupled with the first and second memory, the method comprising:

accessing the first and second memory to read out pixel data of each pair of adjacent pixels of the image frame;

when the image frame has an odd total number of pixels, determining whether a final pixel data associated with a final pixel of the image frame is in a latched state in the data transfer controller; and reading out the final pixel data from the data transfer controller when the final pixel data is in the latched state, whereby all of the pixel data of the image frame except the final pixel data are read out from the first and second memory, and the final pixel data is read out from the data transfer controller.

* * * * *